March 4, 1947.  L. M. JOHNSTON  2,416,757
QUICK RELEASE PARACHUTE HARNESS CONNECTOR
Filed April 28, 1945
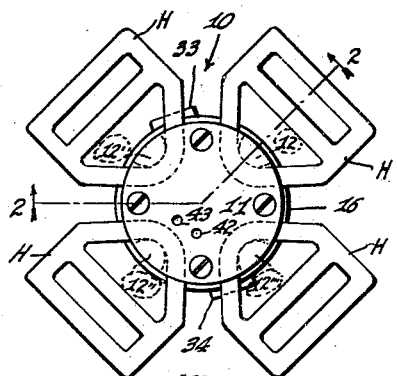
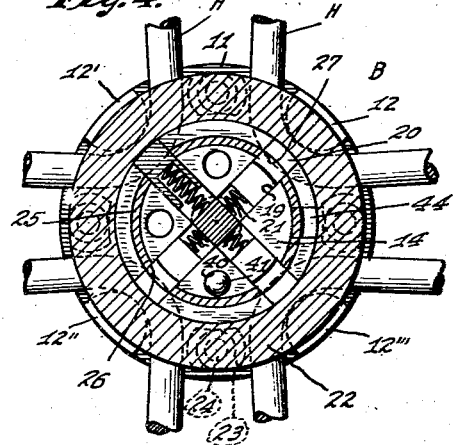
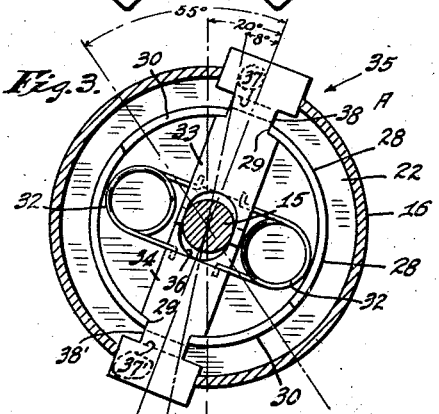
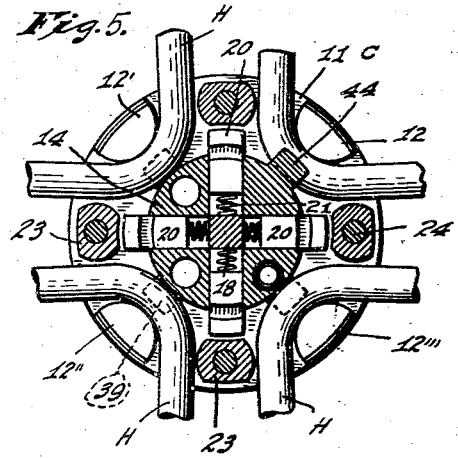
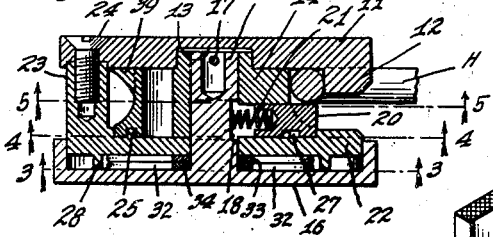
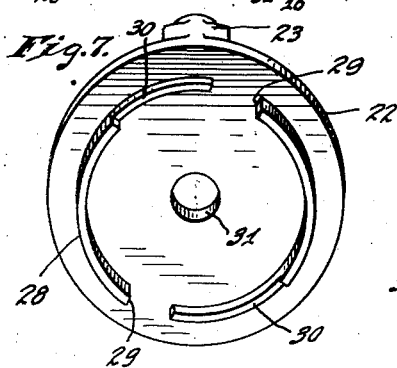
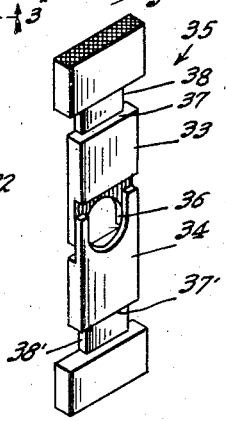
INVENTOR.
LAWRENCE M. JOHNSTON,
BY
Hood & Hahn
ATTORNEYS.

Patented Mar. 4, 1947

2,416,757

UNITED STATES PATENT OFFICE 2,416,757

QUICK RELEASE PARACHUTE HARNESS CONNECTOR

Lawrence M. Johnston, Indianapolis, Ind.

Application April 28, 1945, Serial No. 590,939

14 Claims. (Cl. 24—205)

The present invention relates to a quick-release parachute harness connector. It constitutes an improvement upon the devices disclosed and claimed in my co-pending application Serial No. 535,134 filed May 31, 1944, for "Parachute harness connector," and my co-pending application Serial No. 568,256, filed December 15, 1944, for "Single point release for parachute harness," now Patent No. 2,404,909, dated July 30, 1946.

The primary object of the invention is to reduce the weight, complexity, and cost of such a device, while maintaining maximum efficiency and dependability and providing positive release of the connected elements. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a rear elevation of a device constructed in accordance with the present invention, with parachute elements connected thereby;

Fig. 2 is an axial section taken substantially on the line 2—2 of Fig. 1;

Fig. 3 is a transverse section taken substantially on the line 3—3 of Fig. 2;

Fig. 4 is a similar section taken substantially on the line 4—4 of Fig. 2;

Fig. 5 is a similar section taken substantially on the line 5—5 of Fig. 2;

Fig. 6 is an isometric view of an element of the assembly;

Fig. 7 is a similar view of another element; and

Fig. 8 is a similar view of the latch mechanism forming a part of the present invention.

Referring more particularly to the drawings, it will be seen that I have illustrated a structure including a base 11 formed to provide a plurality of abutments or posts 12, 12', 12'', 12''' upstanding from its floor in a perimetral series centered upon the central axis of said base. At its midpoint, the floor of the base element 11 is formed with a socket 13 in which is journalled a cylindrical projection upon an element 14, the element 14 being formed with an axial bore in which is received the stem 15 of a cover 16, said stem being secured in place by one or more pins 17, or other suitable fastening means. As will be seen, from an inspection of Fig. 2, the cover or operating plate 16 overlies the ends of the posts 12 and constitutes a ledge spaced from the ends of said posts a distance at least equal to the thickness of the hooks or D-rings customarily carried at the ends of the straps of the parachute harness intended to be connected together by the device of the present invention, said hooks being designated by the letter H in the drawings.

Intermediate its ends, the stem 15 is formed with a squared portion 18, the four surfaces of said portion forming abutments at the inner ends of guideways 19 radially arranged in the element 14. Slidably mounted in each of said guideways is a plunger or retainer member 20, each of said members being urged outwardly by a spring 21, received in the guideway and abutting at one end against the flat surface of the stem 15 and at its opposite end against its plunger 20.

A disc-like member 22 is formed with a plurality of legs 23 projecting from one of its surfaces, each of said legs being provided with a threaded bore adapted to receive a screw 24 passing through the base 11 and into such bore, whereby said member 22 is fixedly secured to the base 11. It will be seen that the element 22 overlies the member 14 and thereby retains said member and the plate 16 in assembly with the base 11.

Upon the same face from which project the legs 23, the element 22 is formed with a broken annulus 25 comprising an upstanding rib broken, as at 26, at a point adjacent each of the posts 12, etc. Each break 26 is of sufficient peripheral width to permit one of the retainer members 20 to move radially therethrough. Each of said members is formed with an arcuate groove 27 which, in certain positions of the parts, snugly receives an unbroken portion of the annulus 25 to hold the retainer member against any radial movement in either direction. It will further be seen that the annulus 25 and the grooves 27 are so proportioned and arranged that, when the retainer member grooves embrace the annulus 25, said members are held so closely to the posts 12 etc. that the hooks H cannot escape from their engagement with said posts.

From the opposite surface of the element 22 projects a second broken annulus 28. The annulus 28 is completely broken at the diametrically opposite points 29, 29, and is reduced in axial extent in diametrically opposite regions 30, 30 immediately adjacent the breaks 29. The element 22 is formed with a central aperture 31 through which passes the stem 15 of the plate 16.

In the space defined within the annulus 28 there are mounted two coiled springs 32, 32 cooperating with the two elements of a latch mechanism indicated generally by the reference numeral 35. Such mechanism comprises two allochiral elements 33 and 34, each of which is bifurcated at one end, so that the furcations of the two elements cooperate to define a central opening 36 through which passes the stem 15. The springs 32, 32 act upon said elements 33 and 34 to hold the same in separated relationship, as shown in the drawings. The member 33 is formed, in one surface, with a transverse notch 37; and in the same region, said member is reduced in width, as at 38. The member 34 is similarly formed at 37' and 38'.

When the parts are in the positions shown in the drawing, the portions 38 and 38' of the elements 33 and 34 are locked within the breaks 29, 29 of the annulus 28, whereby the parts are held against relative movement. If, now, the elements 33 and 34 are moved together, against the tendency of the springs 32, 32, the notches 37 and 37' will come into registry with the portions 30, 30 of reduced height of the annulus 28, whereby the latch mechanism may be moved throughout the annular extent of said portions 30, 30. The heads of the elements 33 and 34 are received in suitable slots in the flange of the plate 16; so that the latch elements 33 and 34 control movement of the plate 16, and thus of the member 14, about the axis of the base 11.

That portion of the element 14 in contact with the floor of the base member 11 is formed, at points intermediate the locations of the grooves 19, with a plurality of cam fingers 39 so shaped that, as the element 14 is rotated from its illustrated position to its position occupied when the latch elements reach the opposite extremities of the regions 30 of the annulus 28, said cam elements 39 underride the hooks H just as the retainer members 20 depart from cooperative registry with the posts 12, and said cam members are so formed that, as they underride said hooks, they will positively lift said hooks out of engagement with the post 12 and into the space between the ends of said posts and said plate 22, whereby said hooks will be disengaged from the connector assembly.

Preferably, but not necessarily, only three of such cams 39 are provided in an organization for connecting together four hooks H. In place of the fourth such cam finger, and for cooperation with the fourth hook H, the element 14 carries, in the plane of the retainer members 20, a blocking finger 44. As the three cams 39 engage their hooks H to lift the same out of engagement with their posts 12, the finger 44 will engage the opposite surface of its hook H to hold said hook positively against disengagement from its post. Thereby the connector mechanism is left secured to one of the harness straps, and falls off the parachutist's body along with the harness.

The mechanism herein disclosed is capable of three distinct operative positions. In locked position, the retainer members 20 are peripherally in registry with the posts 12, etc., and are positively held in cooperative proximity to said posts to prevent engagement or disengagement of the hooks H with or from their posts 12 etc. In the release position of the parts, the retainer members 20 are peripherally out of registry with the posts 12, etc., and the cams 39 are in registry therewith to prevent operative engagement of the hooks H with said posts. In load position, the retainer members are peripherally in registry with their posts, but are held in radially projected blocking cooperative relation with said posts only by the resilient force of the springs 21, and said retainer members may be depressed radially toward the axis of the assembly by any force suitably applied to them.

In Figs. 2 and 3 the parts are shown in locked position. In Fig. 4, the parts are shown in load position. And in Fig. 5 the parts are shown in release position. It will be seen that the elements 11, 16 and 22 cooperate to form a body provided with a plurality of perimetrally opening sockets whose mouths are guarded by the posts 12 etc., and that the part 16, of which the element 14 is an operative part, is relatively movable, with respect to the base 11, about the axis of said base. Each of said perimetrally opening sockets is adapted to receive one of the hooks H and, in certain positions of the parts, is additionally guarded by one of the retainer members 20. When the parts are in the position of Fig. 4, a hook H may be moved into the mouth of one of said sockets, between the end of its post 12 and the ledge defined by the parts 16 and 22, and, upon engagement with the retainer member 20, will depress said member toward the stem 15 until the hook H snaps past said member into the space behind the post, whereupon the spring 21 will return the retainer member 20 into cooperative radial proximity to the post 12 to hold the hook H against removal. If, now, the part 16 is rotated in a clockwise direction, as viewed in Fig. 3, to the position of said figure, the parts will be locked in the position of Fig. 2, wherein the hooks H are positively held behind the posts 12. If, however, the parts are rotated in a counter-clockwise direction, as viewed in Fig. 3, to bring the latch mechanism to the opposite ends of the regions 30 of the annulus 28, the retainer members 20 will be moved peripherally out of registry with the posts 12 and the cams 39 will lift the rings H out of engagement with the posts 12 etc.

In order to facilitate proper actuation of the mechanism, the member 14 is provided with a socket 40 in which is received a ball 41 resiliently urged toward the floor of the base 11; and the base 11 is formed with a pair of bores 42 and 43 so located that, when the member 14 is in load position, the ball 41 will be engaged in the bore 42, and when the member 41 is in release position, the ball 41 will engage in the bore 43.

I claim as my invention:

1. In a quick-release parachute harness, a body formed to provide a plurality of abutments engageable, respectively, by the hooks of a harness, an element shiftable with respect to said body, means actuable by said element and engageable with said hooks, at times, to hold the same against disengagement from said abutments, and other means actuable by said element, upon shifting of said element to another position with respect to said body, to shift certain of said hooks positively out of engagement with their abutments.

2. For use with the connector rings of a parachute harness, a body formed to provide a plurality of abutments each engageable by one of said rings, an element oscillably mounted upon said body and formed to provide a ledge overlying all of said abutments and spaced therefrom a distance at least equal to the thickness of said rings, means movable with said element and located, in one position of said element, in cooperative relation with said abutments to block the space between said abutments and said ledge, and other means, angularly spaced from said first-named means and engageable with certain of said rings, when said element is shifted to remove said first-named means from such blocking relation, to move such engaged rings positively into such space, whereby the engaged rings are disengaged from their abutments.

3. For use with the connector rings of a parachute harness, a body formed to provide a plurality of abutments each engageable by one of said rings, an element oscillably mounted upon said body and formed to provide a ledge overlying all of said abutments and spaced therefrom a distance at least equal to the thickness of said rings, a plurality of retainer members movable with said element and located, in one position of said element, in cooperative relation with said abutments to block the space between said abutments and said ledge, and a plurality of cam members movable with said element and angularly spaced individually from said retainer members, each of said cam members engaging one of said rings, when said element is shifted to remove said retainer members from such blocking relation, to move such ring positively into such space, whereby the engaged rings are disengaged from their abutments.

4. For use with the connector rings of a parachute harness, a body formed to provide a plurality of abutments each engageable by one of said rings, an element oscillably mounted upon said body and formed to provide a ledge overlying all of said abutments and spaced therefrom a distance at least equal to the thickness of said rings, a plurality of retainer members perimetrally spaced about said element and movable therewith, said members, in one position of said element, being resiliently held in cooperative relation with said abutments to block the space between said abutments and said ledge, and a plurality of cam members movable with said element and angularly spaced individually from said retainer members, each of said cam members engaging one of said rings, when said element is shifted to remove said retainer members from such blocking relation, to move such ring positively into such space, whereby the engaged rings are disengaged from their abutments.

5. A quick-release connector for the rings of a parachute harness comprising a base providing a floor and a plurality of posts upstanding from said floor and arranged about the axis of said base, an element journalled for movement about said axis and overhanging the upper ends of said posts but spaced therefrom by at least the thickness of such rings, a plurality of retainer members movable with said element and projectible, by movement radial with respect to said axis, into the space between said element and said posts to block movement of said rings through such space when said element is in one position, and latch means cooperating with said base and with said element to hold said element in said one position.

6. A quick-release connector for the rings of a parachute harness comprising a base providing a floor and a plurality of posts upstanding from said floor and arranged about the axis of said base, an element journalled for movement about said axis and overhanging the upper ends of said posts but spaced therefrom by at least the thickness of such rings, a plurality of retainer members movable with said element and projectible by movement radial with respect to said axis, into the space between said element and said posts to block movement of said rings through such space when said element is in one position, said members being resiliently urged to projected positions and being movable out of such projected positions by such rings as such rings are moved toward engagement on said posts, and latch means cooperating with said base and with said element to hold said element in said one position.

7. A quick-release connector comprising a body including a pair of members relatively movable about an axis and formed to provide a plurality of perimetrally-opening sockets, abutment means movable with one of said members, arranged in each of said sockets and partially blocking the mouth thereof, a retaining element associable with each of said abutment means, movable with the other of said members, and cooperating with said abutment means, in one relative position of said members, to block said socket mouths, and means controlling relative movement of said members.

8. A quick-release connector for a plurality of hooks, comprising a base, a plurality of abutments upstanding from said base, each adapted to be engaged by one of said hooks, means associated with said base and movable with respect thereto about an axis, said means including a plurality of retainer members individually cooperable, in one position of said means, with said abutments to block disengagement of said hooks from said abutments, and a broken annulus fixed with respect to said base, said retainer members being formed for engagement with said annulus, at times, to hold said retainer members positively against movement with respect to said axis, said retainer members, when in registry with the broken portions of said annulus, being movable radially of said axis out of blocking relation with their respective abutments.

9. A quick-release connector for a plurality of hooks, comprising a base, a plurality of abutments upstanding from said base, each adapted to be engaged by one of said hooks, means associated with said base and movable with respect thereto about an axis, said means including a plurality of retainer members mounted for radial movement with respect to said axis, means resiliently urging said retainer elements radially outwardly, said retainer elements, when in their outermost positions, cooperating individually with said abutments, in one position of said means, to block disengagement of said hooks from said abutments, and a broken annulus fixed with respect to said base, said retainer members being formed for engagement with said annulus, at times, to hold said retainer members positively in their outermost positions, said retainer members, when in registry with the broken portions of said annulus, being movable radially of said axis out of blocking relation with their respective abutments.

10. A connector for parachute harness comprising a plurality of abutments perimetrally spaced abut a common axis, each adapted to be engaged by an element of a harness, and a plurality of retainer members, each movable peripherally into and out of registry with one of said abutments and further movable radially into and out of cooperative relation with such abutment to block disengagement of a harness element with such abutment.

11. A connector for parachute harness comprising a plurality of abutments perimetrally spaced about a common axis, each adapted to be engaged by an element of a harness, a plurality of retainer members, each movable peripherally into and out of registry with one of said abutments and further movable radially into and out of cooperative relation with such abutment to block disengagement of a harness element with such abutment, and a plurality of cam elements movable peripherally with said retainer members, each cam element being engageable with a harness element, as its retainer member moves out of registry therewith, to move such harness element positively out of engagement with its abutment.

12. A connector for parachute harness comprising a plurality of abutments perimetrally spaced about a common axis, each adapted to be engaged by an element of a harness, a plurality of retainer members, each movable peripherally into and out of registry with one of said abutments and further movable radially into and out of cooperative relation with such abutment to block disengagement of a harness element with such abutment, and releasable latch means operable to hold said retainer members in registry with said abutments.

13. A connector for parachute harness comprising a plurality of abutments perimetrally spaced about a common axis, each adapted to be engaged by an element of a harness, a plurality of retainer members, each movable peripherally into and out of registry with one of said abutments and further movable radially into and out of cooperative relation with such abutment to block disengagement of a harness element with such abutment, and means engageable with and disengageable from said retainer members, during blocking registry of said retainer members with their abutments, to hold said retainer members positively against radial movement.

14. A connector for parachute harness comprising a plurality of abutments perimetrally spaced about a common axis, each adapted to be engaged by an element of a harness, a plurality of retainer members, each movable peripherally into and out of registry with one of said abutments and further movable radially into and out of cooperative relation with such abutment to block disengagement of a harness element with such abutment, each of said retainer members being formed with an arcuate groove, said grooves being formed on a common circle centered on said axis, and a broken annulus fixed with respect to said abutments, said member grooves being engageable with said annulus during registry with said abutments, whereby said members are positively held in blocking association with said abutments, and being movable into registry with the breaks in said annulus without moving out of blocking registry with said abutments.

LAWRENCE M. JOHNSTON.